Figure 3:
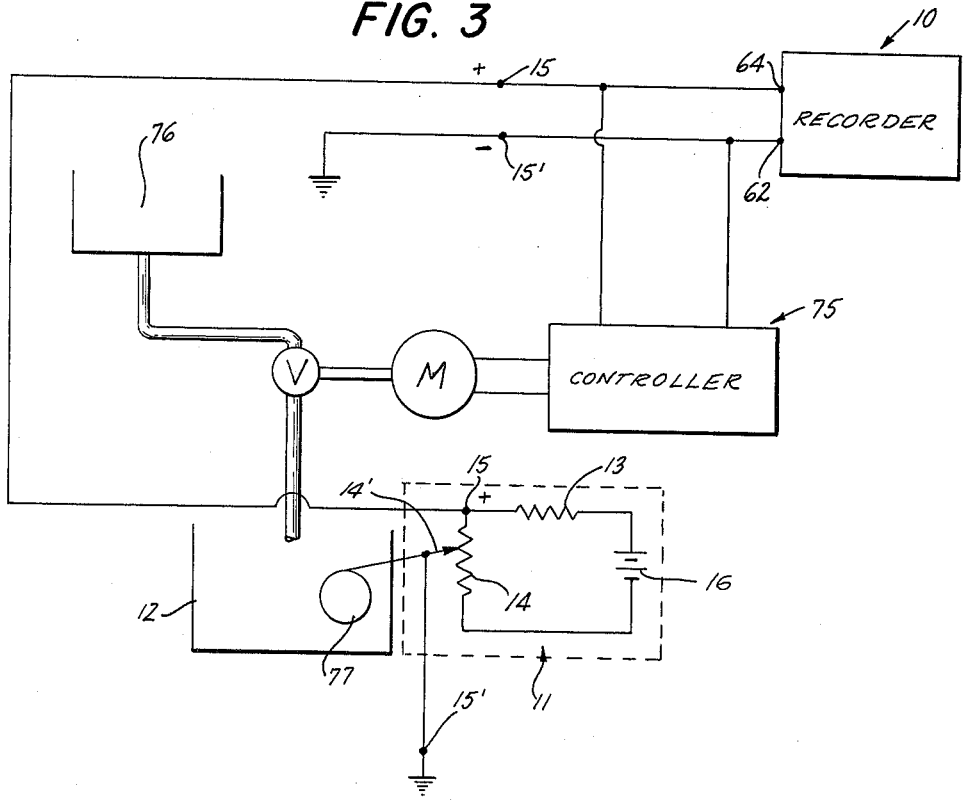

Oct. 5, 1965
M. SACKIN
3,210,769
RECORDER
Filed April 3, 1963
2 Sheets-Sheet 1
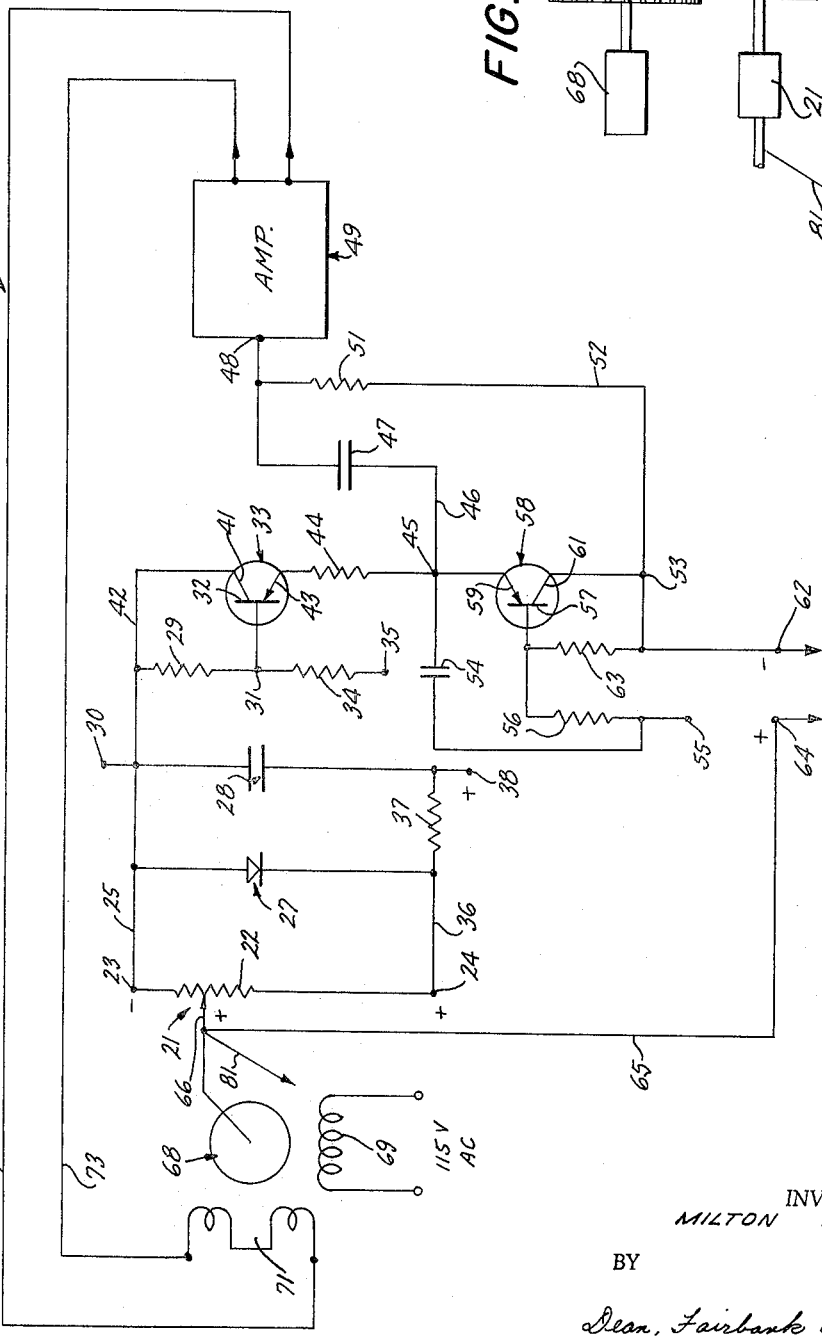
INVENTOR.
MILTON SACKIN
BY
Dean, Fairbank and Hirsch
ATTORNEYS Oct. 5, 1965    M. SACKIN    3,210,769
RECORDER
Filed April 3, 1963    2 Sheets-Sheet 2

INVENTOR.
MILTON SACKIN
BY
Dean, Fairbank and Hirsch
ATTORNEYS

United States Patent Office 3,210,769
Patented Oct. 5, 1965

3,210,769
RECORDER
Milton Sackin, Pittsburgh, Pa., assignor, by mesne assignments, to Hagan Controls Corporation, Pittsburgh, Pa., a corporation of Delaware
Filed Apr. 3, 1963, Ser. No. 270,433
5 Claims. (Cl. 346—32)

This invention relates to the art of recording devices, more particularly of the type used in conjunction with a transducer that determines the condition of a process being monitored and which feeds a signal to a controller to regulate such process.

As conducive to an understanding of the invention, it is noted that where a recorder is employed to indicate the condition of a process and a transducer determines the condition of such process and provides an output signal to both the recorder and a controller which maintains the process within desired operating limits, if the recorder should, in its operation, cause the output signal from the transducer to vary independently of actual variations in the condition of the process being monitored, the controller would receive output signals not accurately related to the condition of the process and hence regulation of the process by the controller would be inaccurate.

In control systems of the above type it is essential that the transducer employed to determine the condition of the process, provide an output signal across the load connected across its output, that will be substantially constant regardless of variations in the value of such output load.

To this end, the transducer employed has a high internal impedance and in calibrating the transducer it is assumed that in use the impedance load across its output is relatively small.

Thus, for example, if the internal resistance of the transducer is one megohm and the resistance across the output is say, less than 1,000 ohms, then regardless of decreases in the value of the output resistance, the current through such output resistance will remain substantially constant.

As a result, an accurate calibration can be made of the transducer output based on the current through the internal impedance of the transducer which is directly related to the value of the condition being monitored.

When equipment such as a recorder is connected across the output of the transducer, the impedance of such recorder is in parallel with the output resistance of the transducer which, as above set forth, has a relatively low value. As a result of such parallel circuit, i.e., transducer output resistance and recorder input resistance, the effective value of the resistance across the output of the transducer will be less than the value of the smaller resistor.

In order to maintain a known calibrated output from the transducer, for example, liquid level against voltage output, so that a controller fed by such output will have a signal applied thereto that is accurately related to the condition of the process being monitored, it is essential that the impedance of the recorder connected across the output of the transducer be relatively high at all times so that in operation the effective resistance across the output of the transducer remains at substantially the value of the transducer output resistor.

For example, if three megohms are placed in parallel with the output resistance of the transducer which is assumed to be 1,000 ohms, the resultant combined output resistance will be approximately 1,000 ohms. However, if 10,000 ohms is put in parallel with the 1,000 ohms output resistance, the resultant output resistance will be close to 900 ohms which would cause an appreciable change in the output voltage signal to be fed to the controller. Thus, even if the process had not changed, the presence of such impedance of 10,000 ohms would cause the signal voltage to the controller to change so that the control system would not be accurate.

Where to maintain the output resistance at substantially its original value, a series connected group of resistors is connected in parallel with the output resistance of the transducer, one of such series connected group having a low value equal to say the output resistance of the transducer and the remaining resistance being high in the order of say three megohms, in such case the effective output resistance of the transducer would remain substantially at its original value and as the recorder would only be connected across the small resistance of the series group, variations in the impedance of the recorder would have substantially no effect on the value of the output resistance of the transducer.

However, with such an arrangement, assuming that the small resistance in the group has a value of 1,000 ohms, only 1/3000 of the output signal from the transducer would be fed to the recorder with the result that it would have to have extremely costly amplifiers to provide a signal of useable strength.

It is accordingly among the objects of the invention to provide a recording device which may be used in conjunction with a transducer and a controller fed by the transducer to regulate a process, the condition of which is sensed by the transducer, which recording device will present a minimum input impedance to the transducer that is always large with respect to the output resistance of the transducer, so that changes in the input impedance of the recorder will have negligible effect on the output signal developed across the output resistance of the transducer, thereby insuring that the output voltage of the transducer will be unaffeced by the recorder so that such output voltage will be accurately related to the condition of the process being monitored, thereby insuring that the controller fed by such output will be able accurately to regulate the process being controlled without interference by the recorder.

Another object is to provide a recording device of the above type in which substantially the entire output signal of the transducer is fed to the recorder so that its sensitivity may be relatively low as compared to a recorder which is fed with a small portion of the output signal, with resultant reduction in the complexity and cost of the amplification system required in the recorder.

According to the invention these objects are accomplished by the arrangement and combination of elements hereinafter described and more particularly recited in the claims.

Figure 4:
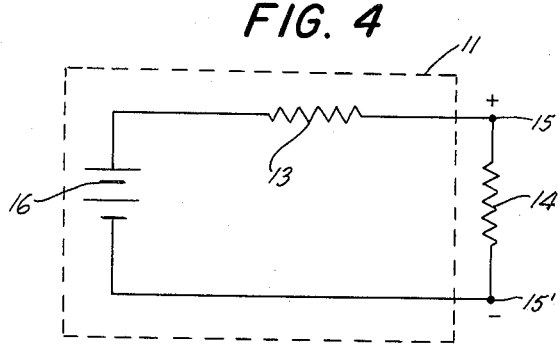

In the accompanying drawings in which is shown one of various possible embodiments of the several features of the invention, FIG. 1 is a circuit diagram of the recorder, FIG. 2 is a diagrammatic view of the strip chart and recording indicator, FIG. 3 is a diagrammatic view of a control system in which the recorder is incorporated, and FIG. 4 is an equivalent circuit of a transducer used with the control system.

Referring now to the drawings, in FIG. 4 is shown the equivalent circuit of a transducer 11 which may be of the type to provide an output signal related to the level of liquid in a tank 12 (FIG. 3).

The transducer 11 has an internal resistance 13 which is relatively high, say, one megohm and the resistance 14 across the output 15 of the transducer is relatively low, say 1,000 ohms or less.

Thus, changes in the value of resistance 14 will have little effect on the current flowing through resistors 13 and 14. As a result, the voltage across resistor 14 between contact arm 14′ and terminal 15′ (FIG. 3) will be directly proportional to the value of resistor 14 between contact arm 14' and terminal 15' (which is related to the liquid level) and the current flow therethrough.

For example, if the battery 16 has a value of 100 volts and resistor 13 one megohm, with the output terminals 15, 15' short circuited, the current through resistor 13 will be .1 ma. If resistor 14 is placed across terminals 15, 15' with a value of 1,000 ohms, the current will be decreased by one part in 1,000 so that the voltage across resistor 14 will be substantially equal to the product of the original current and the value of resistor 14, i.e., .1 ma.×1,000 or .1 volt.

The recorder shown in FIG. 1, used with the transducer 11, comprises a potentiometer 21, the ends of the winding 22 of which are connected respectively to junctions 23, 24. Junction 23 is connected by lead 25 to one side of a Zener diode 27; to one side of a capacitor 28 and to terminal 30 and through resistor 29 to junction 31 and to the base 32 of transistor 33, the junction 31 also being connected through resistor 34 to terminal 35. Junction 24 is connected by lead 36 to the other side of Zener diode 27, and through resistor 37 to the other side of the capacitor 28 and to terminal 38.

The collector 41 of transistor 33 is connected by lead 42 to lead 25. The emitter 43 of transistor 33 is connected through resistor 44 to junction terminal 45. Junction 45 is connected by lead 46 through capacitor 47 to input terminal 48 of amplifier 49 and also through resistor 51 and lead 52 to junction 53.

Junction 45 is connected through capacitor 54 to terminal 55 and also through resistor 56 to the base 57 of transistor 58. The emitter 59 of transistor 58 is connected to junction 45 and the collector 61 is connected to junction 53, the latter also being connected to terminal 62 and through resistor 63 to base 57. Associated with terminal 62 is a terminal 64 which is connected by lead 65 to the movable contact arm 66 of the potentiometer 21, said contact arm being driven by a servo-motor 68. The servo-motor has a winding 69 connected to an alternating potential, say 115 volt A.C. and a control winding 71 connected by leads 72, 73 to the output of amplifier 49.

In the illustrative embodiment shown, the terminals 15, 15' of the transducer which are positive and negative respectively, are connected to terminals 64, 62 of the recorder 10. The terminals 15, 15' are also connected to controller 75 which may be of any suitable type such as shown in Patent No. 2,956,234 and which is designed to energize a motor M, for example, to open and close a valve V. The valve V (FIG. 3) may control the flow of liquid from a reservoir 76 to a tank 12 in which a process may be performed. The level of the liquid in the tank may be determined by a float 77 which, illustratively determines the value of resistance 14 and hence the value of the output signal.

As the operation of the controller and the transducer are well known, they will not be further described.

When the equipment is turned on, a suitable power supply, not shown, will provide the 115 volts A.C. to the energizing winding 69 of the servo motor 68. In addition, a D.C. voltage say in the order of 60 volts will be applied across terminals 30, 38, being positive at terminal 38 with respect to terminal 30 and suitable voltage will be applied to terminal 35 and 55 for proper operation of the transistors 33 and 58.

Due to the application of the D.C. voltage across terminals 30, 38 there will appear across Zener diode 27 a fixed voltage which will be retained at say 5 volts and this voltage is applied across the winding 22 of the potentiometer 21 and defines the reference voltage. The Zener diode functions in conventional manner in conjunction with resistor 37, i.e., the voltage across the diode 27 is substantially independent of variations in current flow through diode 27 due to line voltage fluctuations or the like.

Due to the action of the power supply an alternating potential will be applied across terminals 35 and 55.

Thus, when terminal 35 is positive, terminal 55 will be negative and vice-versa.

These alternating potentials will be applied to the bases of transistors 33 and 58 which illustratively are of the PNP type which conduct when their bases are negative and cut off when positive.

Thus, the transistors 33 and 58 will function as switching devices, one being on and the other off alternately.

With the circuit above described, the voltage across the portion of resistor 14 in circuit will be opposed to that across the portion of the potentiometer winding 22 in circuit to provide a resultant error voltage "e" across terminals 30 and 53 and it is this voltage "e" that is acted on by the transistors 33 and 58.

When transistor 33 conducts, due to voltage "e," a path for current will be provided from terminal 30 through the emitter-collector of transistor 33, resistor 44, junction 45, capacitor 47, resistor 51, line 52 to terminals 53 and 62 to terminal 15', through the resistor 14 of the transducer to terminal 15, back to terminal 64, lead 65 to the movable arm 66 of potentiometer 21 and through the upper portion of said potentiometer to junction 23 and to terminal 30 connected to the collector 41 of transistor 33. Thus capacitor 47 will charge.

When transistor 33 is cut off (i.e., when its base is positive, during each half cycle) there will be no current flow through the aforementioned circuit due to voltage "e." When transistor 33 is cut off, due to the charge on capacitor 47, the latter will funcion as a battery and will discharge through conducting transistor 58, line 52, resistor 51 back to capacitor 47.

Thus, the circuit through the transducer 11 is cut off every half cycle and no current will flow through the transducer at this time.

The actual impedance load on the transducer 11 (which load consists of the resistance value of the resistor 51, illustratively 820,000 ohms and the parallel resistance of the input circuit of amplifier 49 which illustratively has a value of 8.8 megohms, will give a total parallel resistance value called $R_p$ of 750,000 ohms. This, $R_p$ which illustratively has a value of say 750,000 ohms will have current fom the transducer flowing therethrough only each half cycle, i.e., when transistor 33 is conducting.

With equal on-off cycles, the effective impedance $R_p'$ presented to the output impedance of the transducer is four times the actual value of $R_p$, i.e., over three megohms in the illustrative embodiment herein.

This may readily be seen from the following:

In the operation of the equipment, assuming that each of the transistors conduct for equal times T, i.e., one-half cycle each, then T1 (period of conduction of transistor 33)=T2 (period of cut off of transistor 33).

The parameters are such that $T1+T2$ is much less than the time constant of capacitor 47 and impedance $R_p$.

When the transistor 33 is conducting, capacitor 47 is being charged from the voltage "e" through impedance $R_p$. As the time $T1+T2$ is much less than the time constant of capacitor 47, impedance $R_p$, it takes several cycles of $T1+T2$ for the voltage across capacitor 47 to build up.

For example, assuming that $e=1$ volt, when transistor 33 conducts, the voltage across capacitor 47 would start to rise. Since T1 is less than the time constant $CR_p$, the voltage across capacitor 47 will rise only a small amount. Thereupon when transistor 58 is conducting, capacitor 47 would discharge. Assuming that capacitor 47 charged to .3 volt in first time T1, the capacitor 47 would discharge 63% of .3 volt in the time constant $CR_p$. However, since the time T2 is much less than the time constant $CR_p$, it is apparent that capacitor 47 would only discharge a small portion of the .3 volt leaving a voltage across capacitor 47 for the next charging cycle T1.

Thus, when transistor 33 again conducts for the second time T1, the voltage available to charge capacitor 47 will be 1 volt−(.3 volt−$x$) where $x$ is the voltage discharge.

This procedure will repeat rapidly until the voltage across capacitor 47 is approximately .5 volt. At this time an equilibrium is reached since the amount of charge lost during each discharge cycle T2 is equal to the amount gained during each charging cycle T1.

This is so since the forcing current during the charge cycle T1, i.e., $$\frac{1 \text{ volt} - .5 \text{ volt}}{Rp}$$

is equal to the discharge current, i.e., $$\frac{.5 \text{ volt}}{Rp}$$

At this time the current during the charging cycle taken from the voltage "e" of 1 volt is $$\frac{.5}{Rp}$$

since capacitor 47 now has approximately .5 volt.

This current of $$\frac{.5}{Rp}$$

is taken from voltage "e" during time T1 and since the effective voltage due to the voltage "e" is only .5 volt due to the charging of capacitor 47, therefore the average current through $Rp$ over the time $T1+T2$ is only one-quarter of the current that would have flowed through $Rp$ without the switching circuit provided by transistors 33 and 58 and the capacitor 47.

Since one-quarter of the current would be equivalent to having four times the impedance, the effect of the circuit is to place a load on transducer 11 that is four times the value of $Rp$.

Thus at all times during the operation of the equipment, due to the action of transistors 33 and 58 and the associated circuitry, the effective impedance $Rp'$ afforded by the recorder 10 (i.e., over three megohms) to the output of the transducer 11 (i.e., 1,000 ohms) is extremely high.

As previously described, the potentiometer 21 is so connected that the voltage thereacross is in series with the voltage from the output resistor 14 of the transducer but in opposition thereto. Thus, if the potentiometer 21 is set by motor 68 to provide a voltage equal to that across the output resistor 14 of the transducer, there would be no net voltage applied to the input 47 of the amplifier 48. As a result, since substantially no current would flow through resistor 51 it would present substantially an infinite impedance and as this is in parallel with the input impedance of amplifier 49 of approximately 8.8 megohms, the resultant impedance would be substantially 8.8 megohms.

The amplifier 49 may be of any suitable type having high sensitivity so that it may sense all input signals within the range of equipment and is capable of developing sufficient power to drive the conventional servo motor 68.

It will be assumed for purpose of illustration, that there are five volts reference voltage across the resistance winding 22 of the potentiometer due to the action of Zener diode 27 which is in parallel with said winding 22 and which is energized by the D.C. voltage across terminals 30, 38 and that the maximum output voltage from the transducer is 5 volts.

Assuming that the contact arm 66 of the potentiometer 21 is at its midpoint with an input from the transducer 11 of five volts, but the opposite polarity, the resultant voltage will be 2½ volts positive which, when fed to amplifier 49 will be applied to drive the motor 68 to rotate the latter in direction to increase the voltage between contact arm 66 of the potentiometer and the end 23 of winding 22 to 5 volts positive. This will oppose the signal of 5 volts positive from the transducer, leaving a net voltage of zero volts fed to the amplifier 49 so that the motor 68 will no longer be energized and will stop rotating. At this time an indicator 81 driven by the shaft of potentiometer 21 will show five volts or a corresponding valve position on the moving strip chart 82.

With the construction and circuit above described, regardless of whether the motor 68 is at stand-still and with the equipment in balance, at which time the input impedance presented to the transducer 11 is approximately 8.8 megohms or not in balance and rotating to balance the equipment, the minimum effective impedance $Rp'$ (approximately 3 megohms in the illustrative example herein) presented by the recorder 10 to the output resistance 14 of the transducer 11 is a multiple of the actual impedance value $Rp$ (approximately 750,000 ohms) so that the output of the transducer is directly related to the value of the condition being monitored.

Thus the situation which occurs in balancing circuits where the impedance thereof is very low when the balancing portion is operative so that the impedance presented to the transducer is very low with resultant loading of the transducer and erroneous output therefrom, is avoided.

Since the recorder 10 utilizes the full voltage developed across resistor 14, the amplifier 49 in the recorder need not need the sensitivity and hence complexity and cost that it would need if only a small portion of the output signal from resistor 14 was fed thereto.

As many changes could be made in the above equipment and circuit, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A system for monitoring a process, comprising a transducer having a relatively high internal impedance and an output impedance of relatively low value as compared to the internal impedance, a recording device connected across said transducer output, means in said recording device controlled by the output of said transducer to provide an indication related to the value of the transducer output, said recording device presenting a maximum impedance to said transducer when the indicating means has attained a setting related to the transducer output, and means in said recording device to present an effective input impedance to said transducer that is always relatively high as compared to the output impedance of said transducer, even when said indicating means deviates from a value related to the value of the transducer ouput.

2. The combination as set forth in claim 1 in which the means in said recording device to present an input impedance that is relatively high as compared to the output impedance of said transducer comprises a switching device comprising a pair of switches, a resistor of value many times greater than said output impedance, a capacitor in series with said resistor and means alternately to energize said switches, one of said switches when energized providing a current path through said transducer, said resistor and said capacitor, and the other switch when energized providing a discharge path for said capacitor through said resistor, the voltage across said resistor determining the action of said recording device.

3. Signal monitoring apparatus operative with a transducer having an output signal, and including signal means responsive to said output signal for providing an error signal relative to said output signal, a pair of switches, a capacitor and a resistor connected to receive current from said error signal through a first of said switches when that first switch is conducting and connected to discharge through the second of said switches when that second switch is conducting, an amplifier responsive to the charge on said capacitor and operative with the signal means for determining said error signal, and means alternately to energize and thereby make conductive said respective pair of switches.

4. The combination set forth in claim 3, and means to provide a fixed reference potential to said signal means including a Zener diode and a resistor connected in series, and means to apply a source of D.C. potential across said Zener diode and series resistor.

5. The combination set forth in claim 3 in which said switches are transistors and the means alternately to energize said switches comprises a source of alternating current applied to thte bases of said transistors, said transistors conducting when the bases thereof are negative.

References Cited by the Examiner
UNITED STATES PATENTS

| | | | |
|---|---|---|---|
| 2,568,588 | 9/51 | MacGeorge | 73—312 |
| 2,704,342 | 3/55 | Fielden | 318—20.620 |
| 2,787,511 | 4/57 | Ehret | 346—32 |
| 3,026,764 | 3/62 | Allen et al. | 346—32 |

LEYLAND M. MARTIN, *Primary Examiner.*

LEO SMILOW, *Examiner.*